Oct. 4, 1960
S. GUBERNICK
2,955,149
CABLE SUPPORT AND RETRACTOR
Filed Feb. 2, 1959
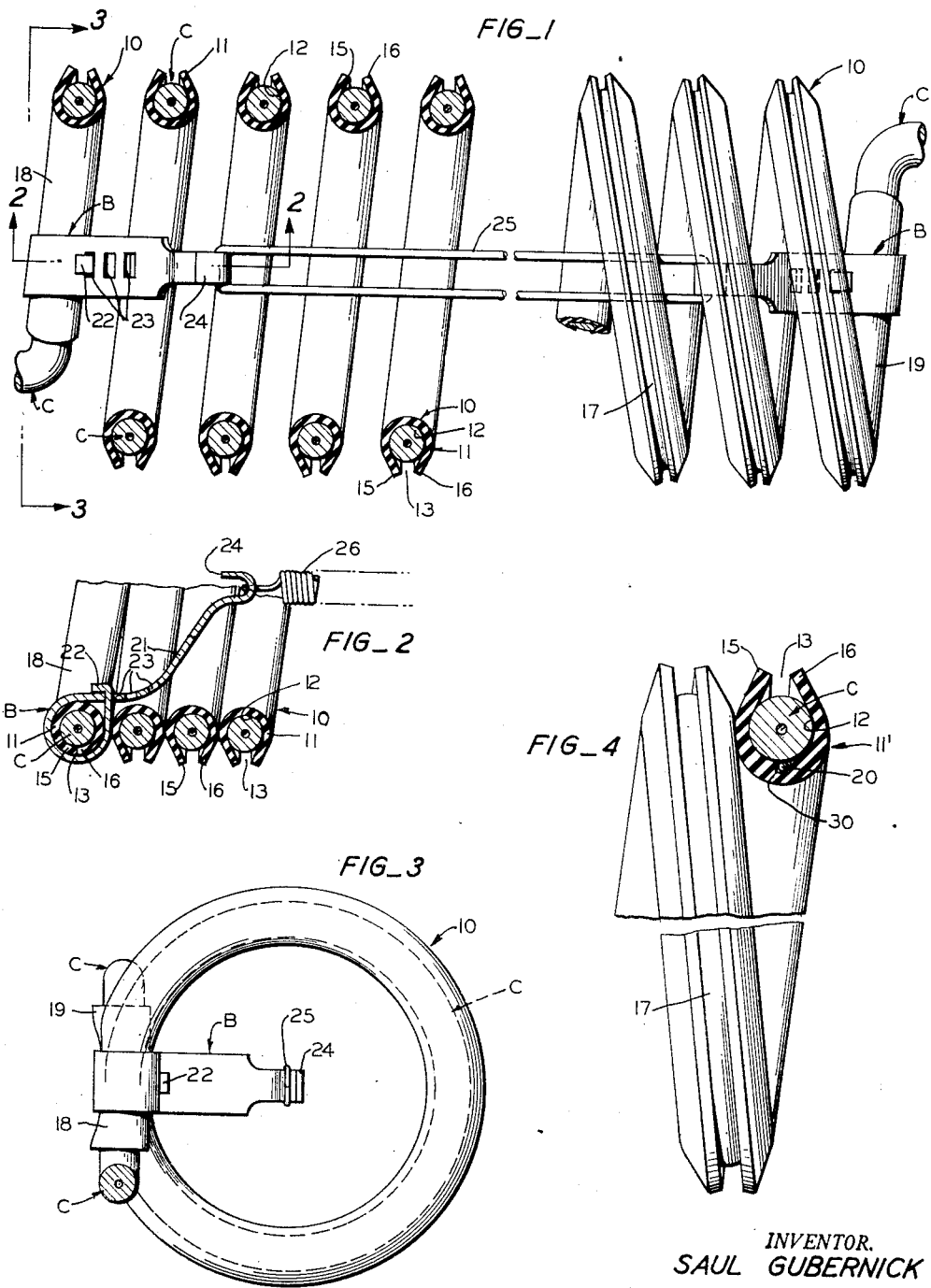
INVENTOR.
SAUL GUBERNICK
BY
Hansen and Lane
HIS ATTORNEYS United States Patent Office 2,955,149
Patented Oct. 4, 1960

2,955,149

CABLE SUPPORT AND RETRACTOR

Saul Gubernick, Los Gatos, Calif.
(344 Foothill Road, San Ysidro, Calif.)

Filed Feb. 2, 1959, Ser. No. 790,738

6 Claims. (Cl. 174—135)

This invention relates to guards and holders for cords or wires for telephone wires and/or cords for appliances and more particularly to cable supports and retractors.

The present invention specifically relates to certain novel improvements in cable retractors of the type shown, described and claimed in my co-pending application Serial No. 696,811, filed November 15, 1957, which issued April 7, 1959, as United States Patent No. 2,880,992.

One of the principal objects of this invention is to provide a semitubular retractable coiled cable support which is molded or formed spirally and open along the periphery of each convolute thereof to admit a cable or wire into the same for supporting that section of such cable or wire so confined in a spiral coil and means for securing the cable or wire in such position at the end convolutes of such spiral coil. To this end I have provided a coil of tubular material which is split along its length and at the extreme periphery of each its convolutions so as to present a partially open groove of more than semitubular central portion so that a limp wire or cable can be wound about the open convolutes and seated in the spiral groove provided thereby.

Another object is to provide such a coiled cable support with means for securing the end convolutes thereof to a cable confined therein.

It is another object of this invention to provide such a coiled cable support with means for contracting the same into a closed spiral.

These and other objects and advantages of the present invention will become apparent from a reading of the following description in connection with the drawing in which:

Fig. 1 is a side elevation of a cable support and retractor partially in longitudinal section.

Fig. 2 is a fragmentary longitudinal section thereof as seen from line 2—2 of Fig. 1.

Fig. 3 is an end elevational view of Fig. 1 as seen from line 3—3 thereof; and

Fig. 4 is a partial longitudinal section showing a modified form of the retractable cable support.

In the drawing 10 generally indicates a cable support constructed in accordance with the present invention.

The cable support 10 comprises a length elongated tube 11 of resilient material which is initially formed as a spiral coil providing a spiral chamber or hollow center 12 open as at 13 along the extreme peripheral margin of each convolute and molded or so formed that the chamber 12 has somewhat the shape of a horseshoe in cross section. This is best seen in the sections cut through the material 11 wherein it will be noted that the tubular material will embrace a wire or cable C over more than half its circumference (cross sectionally) and up to three quarters of the round cable will be confined within the chamber 12. It will be noted further that a pair of arm-life sides 15 and 16 of the tubular material adjacent the opening 13 therein are straight and tangently disposed to the chamber portion of the tubular body and would tend to converge with each other if long enough. However, since these arms 15 and 16 are formed from the tube 11 they leave a gap or entrance way 17 for the cable C which is to be wound around the spirally coiled tubular material. Since the material from which the tube is made is relatively stable yet resilient these arms 15 and 16 will spread apart readily upon manually forcing the cable or wire between them and once the wire is confined within the chamber 12 these arms 15 and 16 will again assume angular converging disposition relative to each other so that the wire will be embraced cross sectionally more than half the tubular material and preferably about three quarters circumscribed thereby.

From the foregoing it will be appreciated that that portion of the cable C confined within the spirally coiled tube 12 will assume a conforming coiled condition.

The tubular material is preferably made of molded rubber or plastic which will contract and assume its initial shape as a closed spiral coil, i.e., a coil in which the convolutes contract toward side by side relation to each other in the manner of a tension spring. It will therefore be appreciated that a cable or wire confined within the spiral chamber 12 provided will conform to the spiral coil. To assure against relative axial movement between the cable C and the cable support each end convolution 18 and 19 of the coiled tube 11 is secured to the wire or coil by a strap or band B (Figs. 1 and 2).

In cases where the cable support 10 is constructed from rubber, which notoriously resumes its initially molded shape and form, the cable will be confined by the cable support of the present invention and retractable therewith upon being released after extension or pulling on the cable or wire. In cases where plastics are used or some forms of rubber in which there is little or no resiliency or tendency to reassume its initial shape or form; or in cases of fatigue of some resilient materials, supplemental spring means is employed. One form of such supplemental spring means is shown in Fig. 4 wherein it will be noted that a metal wire spring 20 is seated in each convolute of the tubular coil 11' so as to draw the latter into closed coil condition.

Another manner of accomplishing this desired effect is in the provision of an elastic or spring like connector between the two end convolutes 18 and 19 of the spirally coiled tube 11 as shown in Figs. 1, 2 and 3. This is done in connection with the previously mentioned bands B by which end convolutes of the coil are secured to the cord C. As best seen in Fig. 2 the band B is a strap of soft semirigid metal 21 like a pipe strap which is wound about the tube 11 to press its open arms 15 and 16 back into circumferential position. The band B is fastened by a reduced tongue piece 22 at one end thereof extending through a slot 23 formed through the strap 21. Several such slots 23 in spaced relation to each other facilitate the use of the strap on tubes and cords of different diameter.

These straps 21 on each band B have a hook 24 formed integrally thereof. These hooks 24 are disposed at approximate center of the coiled tubing 11 and extend toward each other, i.e. inwardly the coil, to provide anchors for the opposite ends of an elastic band 25 (Fig. 1) or tension spring 26 (Fig. 2) as the case may be. In this manner a plastic type coil is made retractable.

Referring to Fig. 4 in which is shown the metal spring 20 embodied in the spirals of the coiled tubing 11' it will be noted that the diameters of the convolutes of the spring 20 are such as to fit into the base of the chamber 12 provided by the tubular material 11'. In this manner the spiral of spring 20 is maintained in conforming relation to the spiral of the coiled tubing. In order not to distort the relative relation of the cord C with respect to the chamber 12, I prefer to provide a recess 30 in the base of the hoseshoe shaped cross section of the tubing 11'. The spiraled strand of spring 20 is seated in the spiraled recesses 30 which serve the twofold purpose of pulling all convolutes of the tube back to contracted position as well as permitting the cable C to seat perfectly co-axially of the spiraled tubing 11'.

While I have described the improvements of my cable support and retractor in specific detail it will be appreciated that the structure thereof may be susceptible to variations, modifications and/or alterations without departing from the spirit of my invention therein. I, therefore, desire to avail myself of all variations, modifications and/or alterations as fairly come within the purview of the appended claims.

What I claim as new and desire to protect by Letters Patent is:

1. A cable retractor comprising an elongated resilient tube formed into a plurality of axially aligned spiral loops each having its peripheral extremity open spirally to receive and support a length of cable within the hollow of said resilient tube; and a spiral spring having the loops thereof within said hollow.

2. A cable retractor comprising a length of resilient tube formed into a plurality of axially aligned spiral loops and having a spirally extending opening at the peripheral extremities of said loops to form a hollow of horseshoe-like cross section in said tube to thereby receive and embrace more than one half the circumferential face of a cable wound about and confined within said length of tube; and a spiral spring having the loops thereof within said hollow.

3. A cable retractor comprising an elongated pliable tube formed into a plurality of axially aligned spiral loops each having its peripheral extremity open spirally to receive and support a cable within the hollow of said tube, and a spiral spring conforming to the spiral convolutions of said spiral tube and seated in the hollow opposite said opening for drawing said convolutions into side by side relation with respect to each other.

4. A cable retractor comprising an elongated pliable tube formed into a plurality of axially aligned spiral loops each having its peripheral extremity open spirally to receive and support a cable within the hollow of said tube, a spiral recess forming part of the hollow of said pliable tube, and a spiral spring seated in said spiral recess for drawing said convolutions toward side by side relation with respect to each other.

5. A cable retractor as defined in claim 4, characterized in that the spiral recess is disposed diametrically opposite the open extremity of the hollow.

6. A cable retractor comprising a length of resilient tube formed into a plurality of axially aligned spiral loops and having a spirally extending opening at the peripheral extremities of said loops to form a hollow of horseshoe-like cross section in said tube for receiving and embracing more than one half the circumferential face of a cable wound about and confined within said length of tube, a spiral recess formed in the bight of the horseshoe-like cross section of said tube and forming a part of said hollow, and a spiral spring seated in said spiral recess tending to draw said convolutions into side by side relation with respect to each other.

References Cited in the file of this patent

UNITED STATES PATENTS

| 2,795,641 | Rowell | June 11, 1957 |
| 2,880,992 | Gubernick | Apr. 7, 1959 |

FOREIGN PATENTS

| 762,343 | Great Britain | Nov. 28, 1956 |